Aug. 30, 1932.  F. H. OWENS  1,874,603

COMBINED MOTION PICTURE AND SOUND CAMERA

Filed Jan. 26, 1927  2 Sheets-Sheet 1

INVENTOR
FREEMAN H. OWENS.
BY
ATTORNEY

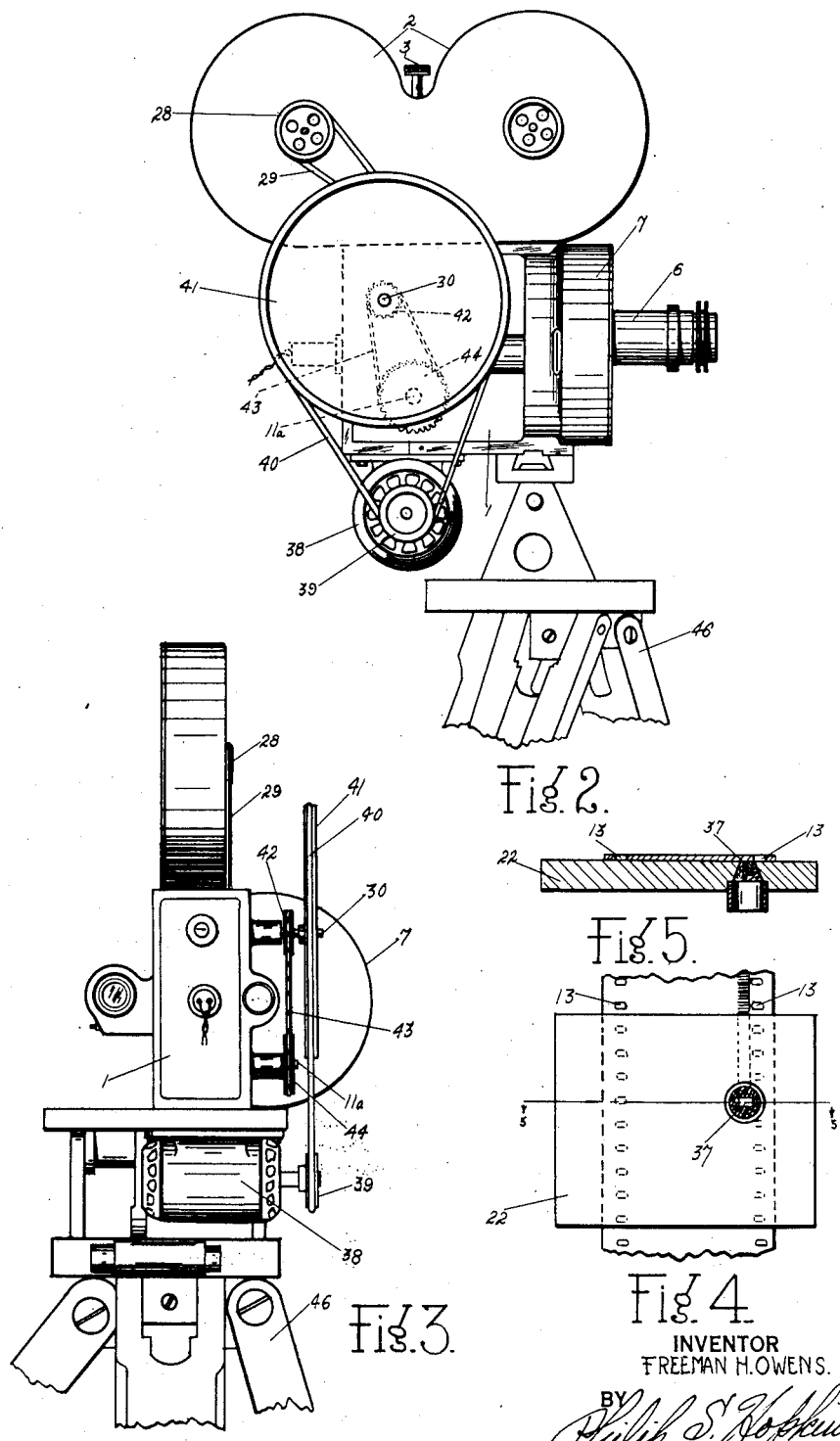

Patented Aug. 30, 1932

1,874,603

UNITED STATES PATENT OFFICE

FREEMAN H. OWENS, OF NEW YORK, N. Y.

COMBINED MOTION PICTURE AND SOUND CAMERA

Application filed January 26, 1927. Serial No. 163,729.

In the making of "talking motion pictures", it is often desirable that the negatives of the pictures and of the sound record appropriate thereto be made simultaneously. In so doing, it is of course necessary that the taking of the pictures and the recording of the sound be perfectly synchronized and to this end I have devised a combined motion picture camera and sound recording device wherein the picture may be taken and the sound recorded photographically at the same time and on the same strip of photographic film, thereby automatically synchronizing the picture taking and the recording of the sound.

This combined arrangement is highly desirable for many reasons, one particular advantage being that with the negative of the pictures and sound on the same film, the process of printing the same on to a single strip of positive film is greatly simplified inasmuch as only one printing operation is necessary and, the sound and pictures being synchronized on the negative, they will also be synchronized on the positive print without the necessity of matching two films for footage as is in the case where the pictures and the sound record are made on separate films.

Another object of my invention provides for the photographing of the pictures on the film strip in the usual manner and for moving the film past the lens with the usual intermittent mechanism, and in addition thereto, provide for the steady continuous movement of the film past the sound photographing station.

Other objects and advantages in details of construction and arrangement of parts will be apparent as the description proceeds, reference now being had to the figures of the drawings wherein like reference numerals indicate like parts.

In the drawings:—

Figure 2 is a side view of the assembled apparatus illustrating clearly the driving mechanism therefor.

Figure 3 is a rear view of the apparatus shown in Figure 2.

Figure 4 is a detail rear view of the sound recording slit holder.

Figure 5 is a detail cross section taken on the line 5—5 of Figure 4.

Figure 1:
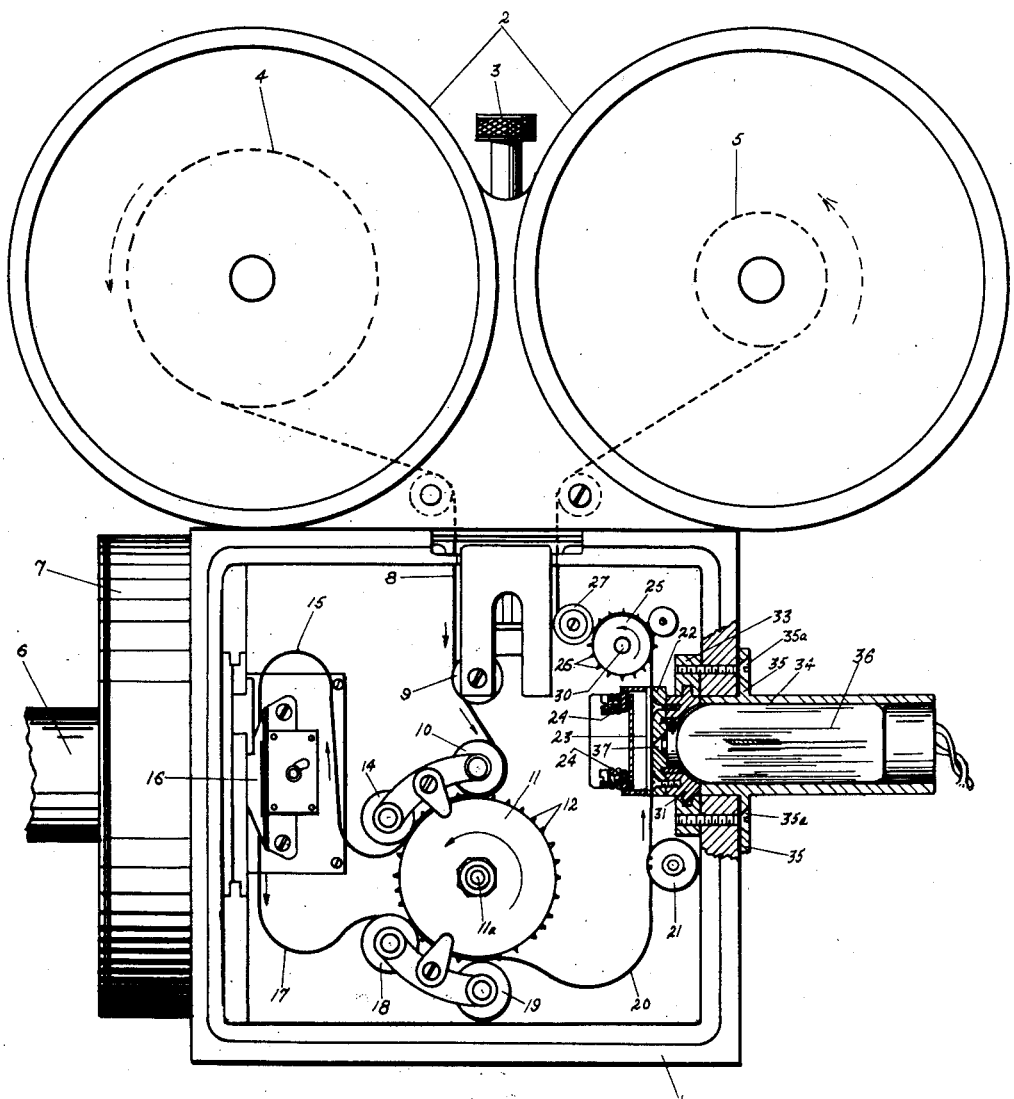
Figure 1 is a side view of a combined picture and sound camera made in accordance with my invention, the cover of the camera being removed and certain parts being shown in section for clearness of illustration.

My improved combined picture and sound camera is designated generally by the reference character 1 and is provided with the usual film reel casing 2 secured to the casing 1 as by the headed bolt 3, and within which is mounted the film supply reel 4 and the film take up reel 5. The usual lens mount 6 is provided on the front of the camera as is the shutter casing 7, both of the usual or desired construction.

The film 8 is brought downwardly from the supply reel 4 into the camera casing 1 where it is guided over idler rollers 9 and 10 to the driving sprocket 11 with which the film 8 engages over a portion of its periphery, the sprocket teeth 12 engaging in the perforations 13 whereby to pull the film downwardly from the supply reel 4.

As the film 8 leaves the sprocket 11, it passes over idler 14 and is formed into a loop 15 in the usual manner and then downwardly through the gate mechanism 16 where it is acted upon by any suitable intermittent driving mechanism, such as is shown in Patent No. 1,509,556—September 23, 1924. The details of this intermittent mechanism are not illustrated, as they form no part of this invention except in combination with the parts hereinafter described and claimed. Suffice it to say that as the film 8 is pulled downwardly by means of the driving sprocket 11, the intermittent mechanism acts to pull the film through the gate mechanism 16 step by step in the well known manner at which time the pictures are made on the film strip.

As the film 8 leaves the gate mechanism 16, it is again formed in the loop 17, and, passing over the idler roller 18, again engages with a portion of the periphery of the driving sprocket 11 whereby the exposed film is continuously fed away from the gate 16 and the intermittent driving mechanism.

Leaving the driving sprocket 11, the film 8 passes over the guide roller 19, which together with the guide rollers 10, 14 and 18 serve to hold the film in engagement with the sprocket teeth 12 on the driving sprocket 11.

A third loop 20 is now formed in the film before it passes upwardly past the guide roller 21 and between the slit holder 22 and the presser pad 23, which latter, is always urged into engagement with the film by the springs 24 whereby the film is held in contact with the surface of the slit holder 22 as it passes upwardly. This loop 20 forms an important feature of this invention, accomplishing the twofold purpose of first permitting the continuous movement of the film past the slit holder as it is fed from the intermittent mechanism, and secondly enabling the operator to properly space the beginning of the sound record from the beginning of the pictures so that when the film is developed and printed the beginning of the pictures and sound record will be properly positioned for projection and reproduction in the apparatus used for that purpose. In other words, the sound reproduction device which is mounted on the picture projection machine, is of course spaced from the point of projection, the film passing first one point and then the other. The beginning of the sound record must therefore be properly spaced from the picture to which it is applicable. The operator, knowing the amount of such spacing, can at the time of threading the combined sound and picture camera, provide the correct length of film between the picture taking aperture and the slit holder 22 by means of the loop 20.

A second sprocket 25 is provided just above the slit holder 22 over which the film 8 is threaded, the perforations 13 engaging over the sprocket teeth 26. Rotation of the sprocket in direction of the arrow will therefore cause a constant and continuous upward movement of the film 8 past the slit holder 22. The film 8 leaving the sprocket 25 passes around the idler 27 and on up to the film magazine 2 where it is wound upon the take up reel 5, there being provided on the shaft of the take up reel 5, a pulley 28 over which passes a belt 29 which also engages around a pulley (not shown) on the end of the shaft 11a of the sprocket 11.

The slit holder 22 is suitably secured to a slidable supporting member 31 having a tongue and groove connection with a fixed supporting member 33 secured to the wall of the camera. A lamp tube 34 provided with the flanges 35 is secured to the camera wall and projects through the same into engagement with the slidable supporting member 31 which may be secured to the flanges 35 and camera wall as by the screws 35a. This tube 34 is adapted to receive a lamp 36 especially designed for sound recording, and the light intensity of which varies in accordance with the sound vibrations which are first suitably changed into electric impulses and then imposed upon the current of the electricity supplying the lamp 36. The slit holder 22 is provided with the slit member 37 which, as shown in this case, comprises a small prism, the apex of which lies flush with the outer surface of the slit holder whereby the emulsion side of the film 8 engages such apex in its passage across the slit holder. The actinic light from the lamp 36 passes only through this narrow optical slit formed by the apex of the prism and photographs the sound record upon the film 8. The slidable supporting member 31 and the slit member 37 are preferably adjustable laterally and rotatably respectively in order that the sound record may be photographed upon the film perfectly horizontal and at a position just inside the perforations 13, as shown clearly in Figures 4 and 5, and as shown and described in detail in my U. S. Patent No. 1,796,121, dated March 10, 1931. This does not interfere with the picture area of the film and enables the operator to simultaneously photograph his pictures and the sound record on a single strip of film.

Figures 2 and 3 illustrate a suitable driving means for the sprockets 11 and 25 and as shown comprises a motor 38 suspended from the underside of the camera 1 and provided with a pulley 39 around which passes an endless belt 40, also looped around a large pulley and fly wheel 41 mounted on the shaft 30 of the sprocket 25. This shaft 30 is also provided with a chain sprocket 42 over which passes an endless chain 43 engaging also around a sprocket 44 mounted on the shaft 11a of the large driving sprocket 11. It will be seen, therefore, that upon starting the motor the two film sprockets 11 and 25 will be simultaneously and synchronously rotated.

A tripod of any desired construction indicated at 46 may be used to support the apparatus.

The operation of my invention is as follows:—The film 8 being threaded through the apparatus as shown clearly in Figure 1, special care being given to the formation of the loops 15, 17 and 20, particularly the latter, which determines the length of film between the picture taking and sound recording stations, the motor is started and the film is wound through the apparatus passing first through the gate 16 where it is moved intermittently past the picture lens aperture (not shown) and then upwardly in a continuous movement past the slit member 37 where the sound record is photographed thereon. Of course, during the movement of the film past the gate 16, the usual intermittent shutter, preferably driven also from the motor 38 in any suitable manner, controls the making of the exposures of the picture areas on the film 8.

Many changes may be made in details of construction and operation without departing from the spirit of my invention. I do not limit myself therefore, to the exact form shown and described other than by the appended claims.

I claim:—

1. In a combined motion picture and sound camera, the combination of, an intermittent film moving means, a second means for moving a film toward and away from said intermittent film moving means, a sound recording device, a third means for continuously moving said film through said sound recording device, and a fourth means including slipless driving connections between the said second means and the said third means for maintaining a freely suspended loop of predetermined length in said film between said sound recording device and said second film moving means.

2. In a combined motion picture and sound camera having a picture taking station and a sound recording station, the combination of, means for intermittently moving a film past said picture taking station, means for feeding said film to and from said picture taking station, means for continuously moving said film past said sound recording station, and means including a slipless driving connection between the second said means and the third said means for maintaining a predetermined length of freely suspended film between said means for feeding the film from the picture taking station and said sound recording station, said length of film being suitable for synchronization of sound and scene when used in a talking motion picture projector.

3. In a combined motion picture and sound camera having a picture taking station and a sound recording station, the combination of, means for intermittently moving a film past said picture taking station, a single film sprocket for feeding said film to and from said picture taking station, means for continuously moving said film past said sound recording station, and means including a slipless driving connection between the last said means and said film sprocket for maintaining a predetermined length of freely suspended film between said film sprocket and said sound recording station, said length of film being substantially greater than the loop of film required by said intermittent film moving means.

4. A combined motion picture and sound camera comprising a casing having apertures for passage in and out of a film, a housing containing film supply and take up reels mounted on the outside of said casing, an intermittent film moving mechanism, a film sprocket in said casing for moving said film toward and away from said intermittent film moving mechanism, film guide means co-operating with said film sprocket, a sound recording device mounted in a wall of said casing, means for continuously moving said film through said sound recording device, and positive drive means connecting the last said means and said sprocket whereby a predetermined length of freely suspended film is maintained therebetween.

5. A combined motion picture and sound camera comprising a casing, a sound recording device including a lamp housing attached externally to a side of said casing and aligned with an aperature therein, a support mounted inside said casing and aligned with said lamp housing, a laterally adjustable member mounted on said support, a rotatably adjustable slit member mounted on said laterally adjustable member, resilient means for keeping a film in contact with said slit member, and means for moving said film between said slit member and said resilient means.

FREEMAN H. OWENS.